United States Patent
Kohlmann

(10) Patent No.: US 7,522,681 B2
(45) Date of Patent: Apr. 21, 2009

(54) METHOD AND DEVICE FOR SYNCHRONIZING A RADIO TRANSMITTER WITH A RADIO RECEIVER

(75) Inventor: Michael Kohlmann, Fuerth (DE)

(73) Assignee: NXP B.V., Eindhoven (NL)

( * ) Notice: Subject to any disclaimer, the term of this patent is extended or adjusted under 35 U.S.C. 154(b) by 610 days.

(21) Appl. No.: 10/145,667

(22) Filed: May 15, 2002

(65) Prior Publication Data

US 2002/0183082 A1 Dec. 5, 2002

(30) Foreign Application Priority Data

May 18, 2001 (DE) ................................ 101 24 223

(51) Int. Cl.
*H03D 1/00* (2006.01)
*H04L 27/06* (2006.01)

(52) U.S. Cl. ........................ 375/343; 375/354; 375/356; 708/422; 714/783

(58) Field of Classification Search ................. 375/343, 375/354, 356; 708/422; 714/783
See application file for complete search history.

(56) References Cited

U.S. PATENT DOCUMENTS 6,385,259 B1* 5/2002 Sung et al. .................. 375/343
6,567,482 B1* 5/2003 Popovic' .................... 375/343
6,839,876 B1* 1/2005 Tong et al. .................. 714/783

OTHER PUBLICATIONS

Ericsson, "New RACH preambles with low auto-correlation sidelobes and reduced detector complexity," 3GPP TSG RAN W1 Tdoc 99-205; Mar. 22-26, 1999.*
Siemens, Texas Instruments, "Generalised Hierarchical Golay Sequence for PSC with low complexity correlation using pruned efficient Golay correlators," 3GPP TSG RAN W1 Tdoc 99-567, Jun. 1-4, 1999.*

* cited by examiner

*Primary Examiner*—David C. Payne
*Assistant Examiner*—Nader Bolourchi
(74) *Attorney, Agent, or Firm*—Lisa K. Jorgenson; Robert Iannucci; Seed IP Law Group PLLC

(57) ABSTRACT

A method and a device are proposed for the synchronization of a radio transmitter and a radio receiver, notably for UMTS, while utilizing a Golay correlator, which synchronization should be performed reliably without imposing severe requirements as regards the frequency stability of the local oscillator. To this end, absolute value squaring B1, B2 is performed in the Golay correlator already prior to the last delay stages (D7, D8).

7 Claims, 2 Drawing Sheets

METHOD AND DEVICE FOR SYNCHRONIZING A RADIO TRANSMITTER WITH A RADIO RECEIVER

Figure 1:
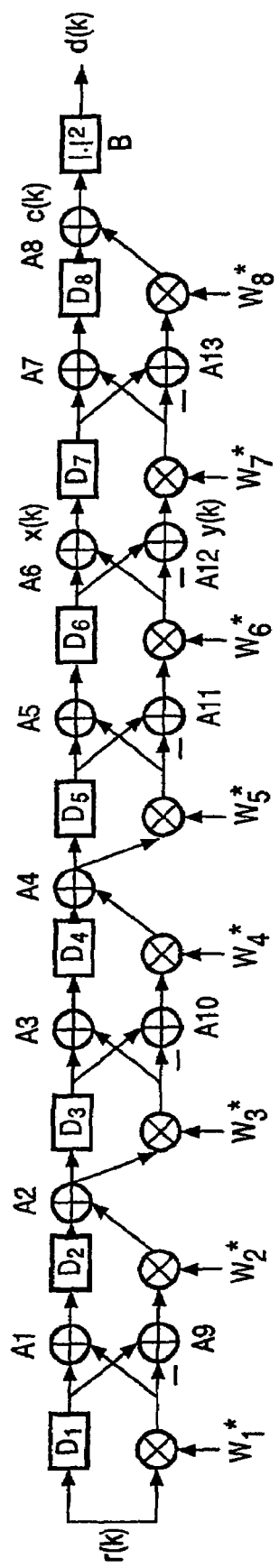

The invention relates to a method and a device for synchronizing a radio transmitter and a radio receiver, notably in a mobile radio system, while utilizing a Golay correlator.

A method of this kind is described in WO 00/67405. The base station and the mobile station in mobile radio systems must be synchronized. At the beginning of the search for a base station the mobile station utilizes a primary synchronization channel (PSCH) in that it searches for the base stations that can be received with the greatest power in the relevant location. In the IMTS mobile radio system, operating with the CDMA system, the length of the synchronization sequence amounts to 256 chips. Matched filters are provided for the synchronization. Such filters are constructed as Golay correlators.

WO 00/54424 describes a method of synchronization in a radio communications system. Golay sequences and Golay correlators are used therein.

WO 00/51392 discloses a method of reducing the synchronization time in a wireless CDMA system. The channel synchronization utilizes the Golay code.

A cell search cycle in a CDMA (Code Division Multiple Access) communication system is also described in U.S. Pat. No. 6,088,382.

The article in IEEE Journal on selected areas in communications, Vol. 18, No. 8, August 2000, pp. 1470 to 1482, describes the cell search in a CDMA mobile radio system, notably in a wideband CDMA system in the primary synchronization channel (PSCH). In order to suppress the effect of frequency errors on the synchronization, sub-lengths of the synchronization signal are processed (see FIG. 6 in the latter article).

The Golay correlation per se is an efficient method of achieving time slot synchronization in the UMTS system. The Golay correlator then forms a matched filter which is matched to the synchronization code sequence periodically transmitted via the primary synchronization channel.

However, the standard Golay correlation is very sensitive in respect of given frequency deviations between the local oscillators (LOs) which are active in the transmitter and the receiver. Frequency deviations thus affect the synchronization. Because the carrier frequency in the UMTS system is 2 GHz in conformity with a bit rate of 3.84 Mchips/s, small frequency deviations already have a significant effect. An intricate procedure is required to achieve a high frequency stability for the oscillators. Such a step is acceptable in the base stations. In the mobile stations, however, a high frequency stability can hardly be achieved from an economical point of view.

It is an object of the invention to provide a method and a device of the kind set forth in which the frequency stability of the local oscillator need not satisfy severe requirements.

The above object is achieved in accordance with the invention as disclosed in the characterizing part of the independent claims. The invention is suitable for use in UMTS with CDMA.

As a result of the invention, synchronization can be reached with a Golay correlator even in the case of a low frequency stability of the oscillators, that is, without significantly increasing the expenditure on hardware. In conformity with the described method the amount of calculation work is reduced; this ultimately also saves power.

The invention is based on the recognition of the fact that when sub-lengths of the synchronization signal sequence frequency are correlated, deviations of the oscillator have less effect on the correlation result than in the case of a correlation over the full length of the synchronization signal sequence.

Figure 2:
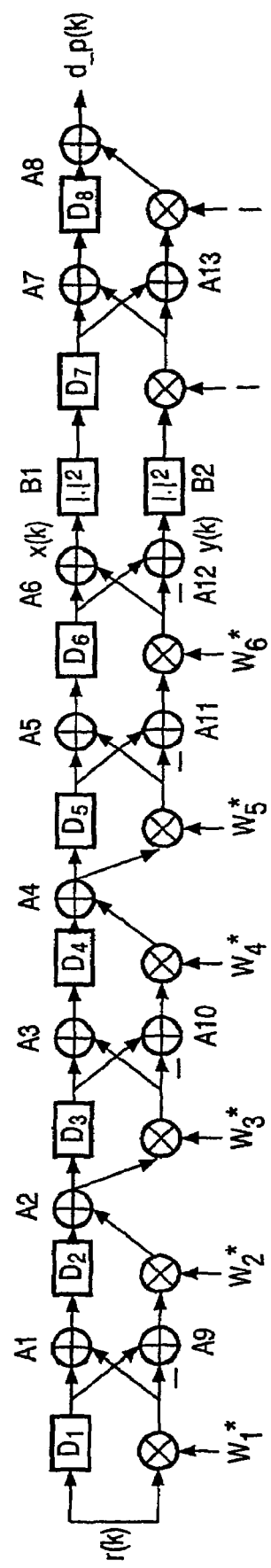
Figure 3:
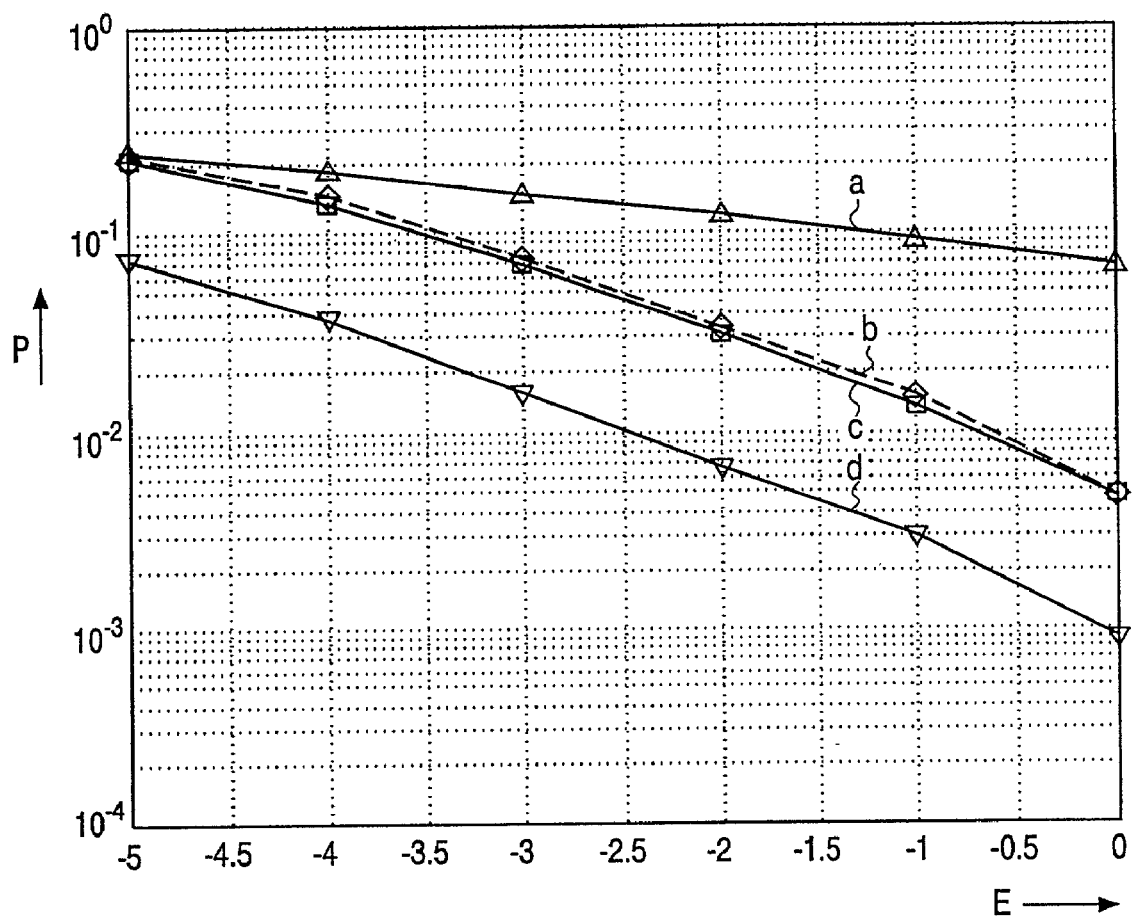

Advantageous embodiments of the invention are disclosed in the claims and the following description. In the drawing:

FIG. 1 shows a standard (pruned) Golay correlator for a synchronization signal sequence of 256 chips in conformity with the state of the art, FIG. 2 shows a Golay correlator modified in accordance with the invention, and FIG. 3 shows a comparison diagram relating to synchronization results.

The Golay correlator which is known, for example, from WO 00/67405 has eight delay stages D1 to D8 with successive delay factors 2, 4, 1, 8, 32, 16, 64, 128 in conformity with the synchronization signal length of 256 chips specified for UMTS. The correlator comprises eight complex multipliers W1 to W8 which perform multiplications by +1 or −1. Moreover, complex adders A1 to A13 are provided. The Golay correlator forms the output signal sequence c(k) at the adder A8 from the input synchronization sequence r(k). For example, in the case of a sub-length behind D6, the signal x(k) is present at the adder A6 and the signal y(k) is present at the associated adder A12. In conformity with the function of the Golay correlator, in this example there is obtained:

$$c(k)=x(k-D_8-D_7)+W_7y(k-D_8)+W_8x(k-D_7)-W_7W_8y(k).$$

The value d(k) which is essential for this synchronization is derived from c(k) by absolute value squaring B. The value c(k) is complex; d(k) is real because of the absolute value squaring.

The Golay correlator described thus far is suitable if the frequency deviations of the oscillators are not excessively large. However, in the presence of customary frequency deviations the signal d(k) is not adequate for the synchronization of the transmitter (mobile station or base station) with the receiver (base station or mobile station).

FIG. 2 shows a modified Golay correlator. In this correlator the complex adder A6, carrying the signal x(k), is succeeded by an absolute value squarer B1 and the complex adder A12, carrying the signal y(k), is succeeded by an absolute value squarer B2. The absolute value squarers B1 and B2 succeed the delay stages D1 to D6 and precede the delay stages D7 and D8. Consequently, the absolute value squaring takes place already after the delay stage D6 in such a manner that a sub-signal sequence is used for forming the signal dp(k) which is essential to the synchronization and is present at the output of the adder 8. The complex multipliers W7 and W8 as provided in the Golay correlator shown in FIG. 1 can now be dispensed with per se. They multiply only by "1".

Prior to the absolute value squaring in B1 and B2, the input signal sequence is processed in a complex fashion. After the absolute value squaring in B1 and B2, the signals x(k) and y(k) are processed in a real fashion because of the absolute value squaring. Such absolute value squaring prior to the delay stages D7 and D8 ultimately ensures that the output signal d−p(k) provides better correlation or synchronization in the primary synchronization channel (PSCH).

The curves a, b, c and d in FIG. 3 represent synchronization results of correlation methods in the primary synchronization channel, where P is the probability that the correlation, and hence the synchronization, is not successful, and E denotes the relative receiving power.

The curves a and b are based on a frequency stability of the oscillator of <5.0 ppm (parts per million). The curves c and d are based on a frequency stability of <3.5 ppm. For the curves a and d the correlation has been performed over the entire length (256 chips) of the synchronization sequence, that is, by means of a Golay correlator in conformity with the present state of the art (FIG. 1).

For the curves b and c the correlation has been performed over a sub-length (64 chips) of the synchronization sequence by means of the modified Golay correlator as shown in FIG. 2. The curve a represents the poorest result. The curves b and c show a probability of a positive synchronization result which becomes higher as the relative receiving power is higher, that is, in comparison with the curves a and d. As can be seen, the curves b and c extend nearer to one another than the curves a and d. This demonstrates that the correlation method of FIG. 2 yields a high degree of insensitivity of the synchronization result to frequency fluctuations. Experiments have demonstrated that a local oscillator which has a frequency stability of only approximately 15 ppm is adequate.

If in individual cases a high frequency stability of 3.5 ppm exists while use is made of the Golay correlator of FIG. 2 and the curve b is to be obtained, a facility may be provided for switching over the Golay correlator from the type shown in FIG. 2 to that shown in FIG. 1. To this end, it is only necessary to bridge the absolute value squarers B1 and B2 and to multiply by W7 and W8 in a complex fashion at the relevant position instead of by "1".

When the described method and device are used, it suffices to provide the mobile station or the base station with a low-cost local oscillator which need not have a high frequency stability. Moreover, tuning of the oscillator (requiring calculation time and storage space) will not be necessary either.

Using the same circuit (hardware), different modes of operation of the primary synchronization signal detector can be realized. In the modified Golay correlator, fewer complex multiplications and complex additions have to be carried out in a synchronization cycle, that is, in comparison with the state of the art, so that the power consumption of the mobile station is reduced.

The invention claimed is:

1. A method of performing chip synchronization of a radio transmitter and a radio receiver using a Golay correlator comprising a sequence of stages including complex stages, wherein in each of a plurality of said complex stages at least one sum is formed of a complex output signal from a prior stage delayed by a delay stage and a complex output signal from the prior stage multiplied by a weighting factor, the method comprising:
    performing absolute value squaring of output signals of an intermediate stage prior to a final delay stage to produce a pair of real-valued output signals; and
    processing the real-valued output signals in one or more additional stages, wherein in each of the additional stages at least one sum is formed of an output signal from a prior stage delayed by a delay stage and an output signal from the prior stage multiplied by a weighting factor.

2. A method as claimed in claim 1, wherein the absolute value squaring is performed prior to a next-to-last delay stage.

3. A method as claimed in claim 1, wherein a delay stage of one of said additional stages implements a delay corresponding to a sub-length of 64 chips of a synchronization signal sequence comprising 256 chips.

4. A Golay correlator for performing chip synchronization comprising:
    a sequence of stages including complex stage, wherein in each of a plurality of said complex stages at least one sum is formed of a complex output signal from a prior stage delayed by a delay stage and a complex output signal from the prior stage multiplied by a weighting factor;
    absolute value squarers for performing absolute value squaring of output signals of an intermediate stage prior to a final delay stage to produce a pair of real-valued output signals;
    one or more additional stages for processing the real-valued output signals, wherein in each of the additional stages at least one sum is formed of an output signal from a prior stage delayed by a delay stage and an output signal from the prior stage multiplied by a weighting factor; and
    means for bypassing the absolute value squarers and switching operation of the additional stages from real to complex.

5. A device as claimed in claim 4, wherein weighting factors applied to the additional stages are equal in "1".

6. A method of performing chip synchronization of a radio transmitter and a radio receiver using a Golay correlator comprising a sequence of stage including complex stages, wherein in each of a plurality of said complex stages at least one sum is formed of a complex output signal from a prior stage delayed by a delay stage and a complex output signal from the prior stage multiplied by a weighting factor, the method comprising:
    in one mode;
        performing absolute value squaring of output signals of an intermediate stage prior to a final Golay stage to produce a pair of real-valued output signals; and
        processing the real-valued output signals in one or more additional stages, wherein in each of the additional stages at least one sum is formed of an output signal from a prior stage delayed by a delay stage and an output signal from the prior stage multiplied by a weighting factor; and
    in another mode;
        performing absolute value squaring of output signals of a final stage to produce a real-valued output signal indicative of a degree of correlation between received data and a synchronization sequence.

7. The method as claimed in claim 6, comprising, in said another mode of operation:
    bypassing absolute value squarers that would otherwise performing absolute value squaring of output signals of an intermediate stage prior to a final delay stage; and
    switching operation of the additional stages from real to complex.

* * * * *

UNITED STATES PATENT AND TRADEMARK OFFICE
CERTIFICATE OF CORRECTION

PATENT NO. : 7,522,681 B2
APPLICATION NO. : 10/145667
DATED : April 21, 2009
INVENTOR(S) : Michael Kohlmann Page 1 of 1

It is certified that error appears in the above-identified patent and that said Letters Patent is hereby corrected as shown below:

<u>Column 4</u>
Line 7, "including complex stage" should read as -- including complex stages --

Line 27, "applied to the additional stages are equal in "1"." should read as -- applied to the additional stages are equal to "1". --

Line 36, "in one mode;" should read as -- in one mode: --

Signed and Sealed this

Tenth Day of November, 2009

David J. Kappos
*Director of the United States Patent and Trademark Office*